(12) United States Patent
Lee et al.

(10) Patent No.: US 9,682,614 B2
(45) Date of Patent: Jun. 20, 2017

(54) POWER TRANSMISSION APPARATUS FOR HYBRID ELECTRIC VEHICLE

(71) Applicant: Hyundai Motor Company, Seoul (KR)

(72) Inventors: Keunseok Lee, Whasung-Si (KR); Kum Lim Choi, Whasung-Si (KR)

(73) Assignee: Hyundai Motor Company, Seoul (KR)

(*) Notice: Subject to any disclaimer, the term of this patent is extended or adjusted under 35 U.S.C. 154(b) by 17 days.

(21) Appl. No.: 14/800,087

(22) Filed: Jul. 15, 2015

(65) Prior Publication Data
US 2016/0102742 A1  Apr. 14, 2016

(30) Foreign Application Priority Data
Oct. 13, 2014 (KR) .................. 10-2014-0137703

(51) Int. Cl.
| | |
|---|---|
| F16H 3/48 | (2006.01) |
| B60K 6/365 | (2007.10) |
| F16H 37/04 | (2006.01) |
| B60K 6/36 | (2007.10) |
| B60K 6/48 | (2007.10) |
| B60K 6/547 | (2007.10) |
| F16H 3/00 | (2006.01) |

(52) U.S. Cl.
CPC .............. *B60K 6/365* (2013.01); *B60K 6/36* (2013.01); *B60K 6/48* (2013.01); *B60K 6/547* (2013.01); *F16H 37/046* (2013.01); *B60K 2006/4816* (2013.01); *F16H 3/006* (2013.01); *F16H 2200/006* (2013.01); *F16H 2200/0021* (2013.01); *F16H 2200/0086* (2013.01); *Y02T 10/6221* (2013.01); *Y02T 10/6256* (2013.01); *Y10S 903/91* (2013.01); *Y10S 903/919* (2013.01)

(58) Field of Classification Search
CPC .......................... Y10S 903/919; Y10S 903/91
See application file for complete search history.

(56) References Cited

U.S. PATENT DOCUMENTS

| | | | |
|---|---|---|---|
| 2004/0048710 A1* | 3/2004 | Tumback | B60K 6/365 |
| | | | 475/5 |
| 2010/0009805 A1 | 1/2010 | Bachmann | |
| 2012/0035013 A1 | 2/2012 | Appeltauer | |
| 2013/0109530 A1* | 5/2013 | Kaltenbach | B60K 6/387 |
| | | | 477/5 |

(Continued)

FOREIGN PATENT DOCUMENTS

| | | |
|---|---|---|
| JP | 2010-513107 A | 4/2010 |
| JP | 2012-518565 A | 8/2012 |

(Continued)

*Primary Examiner* — Sherry Estremsky
*Assistant Examiner* — Lillian Nguyen
(74) *Attorney, Agent, or Firm* — Morgan, Lewis & Bockius LLP (57) ABSTRACT

A power transmission apparatus for a vehicle may include a first shift module configured to change torque input from an engine into four speed stages and to output the four speed stages, a motor/generator directly connected an output side of the first shift module, a second shift module configured to change the four speed stages input from the first shift module into eight speed stages by using a planetary gear set and to output the eight speed stages, and an output device connected to an output side of the second shift module through an output shaft.

20 Claims, 4 Drawing Sheets

(56) References Cited

U.S. PATENT DOCUMENTS

| | | | |
|---|---|---|---|
| 2013/0324341 A1* | 12/2013 | Cho | B60W 20/00 475/5 |
| 2013/0324362 A1* | 12/2013 | Lee | B60W 20/30 477/5 |
| 2014/0123806 A1* | 5/2014 | Lee | B60K 6/50 74/661 |
| 2014/0157923 A1* | 6/2014 | Lee | F16H 3/08 74/330 |
| 2015/0321662 A1* | 11/2015 | Park | B60K 6/22 475/5 |

FOREIGN PATENT DOCUMENTS

| | | |
|---|---|---|
| JP | 2013-107527 A | 6/2013 |
| JP | 2013-203098 A | 10/2013 |
| KR | 10-1113665 B1 | 3/2012 |

* cited by examiner

|  |  | CL1 | CL2 | CL3 | BK1 | SL1 | | SL2 | |  |
|---|---|---|---|---|---|---|---|---|---|---|
|  |  |  |  |  |  | D1/5 | D3/7 | D2/6 | D4/8 |  |
| REV | 1 |  |  | ● |  |  |  |  |  | inverse-rotation of MG |
|  | 2 |  |  |  | ● |  |  |  |  |  |
| 1st / HEV |  | ● |  | ● |  | ● |  |  |  | ENG operation / MG operation |
| 2nd / HEV |  |  | ● | ● |  |  |  | ● |  |  |
| 3rd / HEV |  | ● |  | ● |  |  | ● |  |  |  |
| 4th / HEV |  |  | ● | ● |  |  |  |  | ● |  |
| 5th / HEV |  | ● |  |  | ● | ● |  |  |  |  |
| 6th / HEV |  |  | ● |  | ● |  |  | ● |  |  |
| 7th / HEV |  | ● |  |  | ● |  | ● |  |  |  |
| 8th / HEV |  |  | ● |  | ● |  |  |  | ● |  |
| EV | 1 |  |  | ● |  |  |  |  |  | MG operation |
|  | 2 |  |  |  | ● |  |  |  |  |  |
| Idle charge |  | ● |  |  |  | ● |  |  |  |  |

|  |  | CL1 | CL2 | CL3 | BK1 | SL1 | | SL2 | |  |
|---|---|---|---|---|---|---|---|---|---|---|
|  |  |  |  |  |  | D1/5 | D3/7 | D2/6 | D4/8 |  |
| REV | 1 |  |  | ● |  |  |  |  |  | inverse-rotation of MG |
|  | 2 |  |  |  | ● |  |  |  |  |  |
| 1st/ HEV |  | ● |  |  | ● | ● |  |  |  | ENG operation / MG operation |
| 2nd/ HEV |  |  | ● |  | ● |  |  | ● |  |  |
| 3rd/ HEV |  | ● |  |  | ● |  | ● |  |  |  |
| 4th/ HEV |  |  | ● |  | ● |  |  |  | ● |  |
| 5th/ HEV |  | ● |  | ● |  | ● |  |  |  |  |
| 6th/ HEV |  |  | ● | ● |  |  |  | ● |  |  |
| 7th/ HEV |  | ● |  | ● |  |  | ● |  |  |  |
| 8th/ HEV |  |  | ● | ● |  |  |  |  | ● |  |
| EV | 1 |  |  |  | ● |  |  |  |  | MG operation |
|  | 2 |  |  | ● |  |  |  |  |  |  |
| Idle charge |  | ● |  |  |  | ● |  |  |  |  |

POWER TRANSMISSION APPARATUS FOR HYBRID ELECTRIC VEHICLE

CROSS-REFERENCE TO RELATED APPLICATION

The present application claims priority to Korean Patent Application No. 10-2014-0137703 filed Oct. 13, 2014, the entire contents of which is incorporated herein for all purposes by this reference.

BACKGROUND OF THE INVENTION

Field of the Invention

The present invention relates to a power transmission apparatus for a vehicle. More particularly, the present invention relates to a power transmission apparatus for a vehicle that achieves eight fixed speed stages, electric vehicle (EV) mode and hybrid electric vehicle (HEV) mode by adding a motor/generator and a planetary gear set to a double clutch transmission achieving four fixed speed stages using two synchronizers.

Description of Related Art

Environmentally-friendly techniques of vehicles are very important techniques on which survival of future motor industry is dependent. Vehicle makers are focusing on development of environmentally-friendly vehicles so as to meet environment and fuel consumption regulations.

Some examples of future vehicle techniques are an electric vehicle (EV) and a hybrid electric vehicle (HEV) that use electrical energy, and double clutch transmission (DCT) that improves efficiency and convenience.

In addition, the vehicle makers promote improvement of efficiency in a power delivery system so as to meet exhaust regulation of countries and improve fuel consumption performance. In order to improve efficiency of the power delivery system, the vehicle makers are trying to put an idle stop and go (ISG) system and a regenerative braking system to practical use.

The ISG system stops an engine when a vehicle stops and restarts the engine when the vehicle begins to run. The regenerative braking system operates a generator using kinetic energy of the vehicle instead of braking the vehicle by friction when the vehicle brakes, stores electrical energy generated at this time in a battery, and reuses the electrical energy when the vehicle runs.

In addition, the hybrid electric vehicle is a vehicle using more than two power sources, and more than two power sources are combined in various ways. Typically, the hybrid electric vehicle uses a gasoline engine or a diesel engine driven by fossil fuel and a motor/generator driven by electrical energy.

In addition, one example of a transmission applied to the hybrid electric vehicle is the DCT. According to the DCT, two clutches are applied to a manual transmission layout. Therefore, efficiency and convenience may be improved.

That is, the DCT achieves odd-numbered speed stages and even-numbered speed stages alternately by using two clutches. A mechanism achieving the odd-numbered-speeds and the even-numbered-speeds alternately improves shift feel so as to solve problems of a conventional manual transmission (MT) and an automated manual transmission (AMT).

However, the DCT has such problems that clutch damage and energy loss due to clutch slip may occur when starting, safety may not be secured since backward rolling due to clutch slip occurs excessively in hill-start, shift shock may be strong compared with an automatic transmission since shift time is controlled to be short due to thermal capacity of a clutch.

Recently, a motor/generator and a planetary gear set are added to the DCT. But, if the motor/generator and the planetary gear set are added to the DCT achieving more than six fixed speed stages, a volume of the transmission may be large and fuel economy may be deteriorated due to heavy weight.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission apparatus for a vehicle having advantages of achieving eight fixed speed stages by adding a motor/generator and a planetary gear set to a DCT achieving four fixed speed stages using two synchronizers.

Various aspects of the present invention are additionally directed to providing a power transmission apparatus for a vehicle which achieves EV mode and HEV mode and can be applied to a hybrid electric vehicle by using a motor/generator and a planetary gear set, and to providing a power transmission apparatus for a vehicle which can improve fuel economy by achieving regenerative braking and start charging.

According to various aspects of the present invention, a power transmission apparatus for a vehicle may include a first shift module configured to change torque input from an engine into four speed stages and to output the four speed stages, a motor/generator directly connected an output side of the first shift module, a second shift module configured to change the four speed stages input from the first shift module into eight speed stages by using a planetary gear set and to output the eight speed stages, and an output device connected to an output side of the second shift module through an output shaft.

The first shift module may include a first input shaft selectively connected to an output side of the engine through a first clutch, a second input shaft being a hollow shaft, enclosing the first input shaft, selectively connected to the output side of the engine through a second clutch, and provided with a first input gear fixedly disposed thereon, a third input shaft disposed in parallel with and apart from the first and second input shafts, and provided with a second input gear fixedly disposed thereon, an idle gear device meshed with the first input gear on the second input shaft and the second input gear on the third input shaft so as to transmit torque of the second input shaft to the third input shaft without change in rotating direction, a pair of odd-numbered speed gears rotatably disposed on the first input shaft and operably connected to the first input shaft selectively through a first synchronizer, a pair of even-numbered speed gears rotatably disposed on the third input shaft and operably connected to the third input shaft selectively through a second synchronizer, and an intermediate device including a counter shaft disposed on the same axis with the output shaft, changing the torque of the engine through a plurality of counter gears meshed with the pair of odd-numbered and even-numbered speed gears, and outputting the changed torque into the second shift module.

The idle gear device may include an idle shaft disposed in parallel with the second and third input shafts, an idle input gear fixedly disposed on as first side portion of the idle shaft and meshed with the first input gear on the second input shaft, and an idle output gear fixedly disposed on a second side portion of the idle shaft and meshed with the second input gear on the third input shaft.

The pair of odd-numbered speed gears may include a 1/5 speed gear for achieving a first forward speed stage or a fifth forward speed stage, and a 3/7 speed gear for achieving a third forward speed stage or a seventh forward speed stage, in which the 1/5 speed gear or the 3/7 speed gear may be operably connected to the first input shaft through the first synchronizer.

The pair of even-numbered speed gears may include a 2/6 speed gear for achieving a second forward speed stage or a sixth forward speed stage, and a 4/8 speed gear for achieving a fourth forward speed stage or an eighth forward speed stage, in which the 2/6 speed gear or the 4/8 speed gear may be operably connected to the third input shaft through the second synchronizer.

The intermediate device may include the counter shaft being a hollow shaft and enclosing the output shaft of the output device, a first counter gear meshed with one of the pair of odd-numbered speed gears and one of the pair of the even-numbered speed gears, and a second counter gear meshed with another of the pair of odd-numbered speed gears and another of the pair of even-numbered speed gears, in which the intermediate device may be configured to transmit torque of the first shift module to the second shift module.

The motor/generator may include a rotor directly connected to an output side of the first shift module and being rotatable, and a stator fixed to a transmission housing at a radial exterior of the rotor.

The second shift module may be configured to output torque input from the first shift module to the output device without change in rotation speed or with the rotation speed being increased by operation of the planetary gear set.

The second shift module may include the planetary gear set including three rotation elements, a third clutch selectively connecting one rotation element of the planetary gear set directly connected to the counter shaft of the first shift module with another rotation element of the planetary gear set directly connected to the output shaft, and a first brake selectively connecting the other rotation element of the planetary gear set directly connected to the output shaft with a transmission housing.

The planetary gear set may be a single pinion planetary gear set and include a sun gear directly connected to the output shaft of the output device, a planet carrier directly connected to the counter shaft of the first shift module and selectively connected to the sun gear through a third clutch, and a ring gear selectively connected to a transmission housing through a first brake.

The intermediate device may include the counter shaft disposed at the rear of and on the same axis with the output shaft of the output device, a first counter gear meshed with one of the pair of odd-numbered speed gears and one of the pair of even-numbered speed gears, and a second counter gear meshed with the other of the pair of odd-numbered speed gears and the other of the pair of even-numbered speed gears, in which the intermediate device may be configured to transmit torque of the first shift module to the second shift module.

The second shift module may be configured to output torque input from the first shift module to the output device without change in rotation speed or with the rotation speed being decreased by operation of the planetary gear set.

The second shift module may include the planetary gear set disposed at a front end portion of the counter shaft of the first shift module and including three rotation elements, a third clutch selectively connecting one rotation element of the planetary gear set directly connected to the counter shaft of the first shift module with another rotation element of the planetary gear set directly connected to the output shaft, and a first brake selectively connecting the other rotation element of the planetary gear set with a transmission housing.

The planetary gear set may be a single pinion planetary gear set and include a sun gear directly connected to the counter shaft of first shift module, a planet carrier directly connected to the output shaft of the output device and selectively connected to the sun gear through a third clutch, and a ring gear selectively connected to a transmission housing through a first brake.

According to various aspects of the present invention, a power transmission apparatus for a vehicle may include a first shift module including a first input shaft selectively connected to an output side of the engine through a first clutch, a second input shaft being a hollow shaft, enclosing the first input shaft, selectively connected to the output side of the engine through a second clutch, and provided with a first input gear fixedly disposed thereon, a third input shaft disposed in parallel with and apart from the first and second input shafts, and provided with a second input gear fixedly disposed thereon, an idle gear device meshed with the first input gear on the second input shaft and the second input gear on the third input shaft so as to transmit torque of the second input shaft to the third input shaft, a pair of odd-numbered speed gears rotatably disposed on the first input shaft and operably connected to the first input shaft selectively through a first synchronizer, a pair of even-numbered speed gears rotatably disposed on the third input shaft and operably connected to the third input shaft selectively through a second synchronizer, and an intermediate device including a counter shaft disposed in parallel with the second and third input shafts, changing the torque of the engine through a plurality of counter gears meshed with the pair of odd-numbered and even-numbered speed gears, and outputting the changed torque, a motor/generator directly connected to the counter shaft at the rear of the counter shaft, a second shift module including a planetary gear set including three rotation elements, a third clutch selectively connecting one rotation element of the planetary gear set directly connected to the counter shaft of the first shift module with another rotation element operated as an output element, and a first brake selectively connecting the other rotation element operated as an output element with a transmission housing, and an output device connected to the output element of the planetary gear set through an output shaft.

The intermediate device may include the counter shaft being a hollow shaft and enclosing the output shaft of the output device, a first counter gear meshed with one of the pair of odd-numbered speed gears and one of the pair of the even-numbered speed gears, and a second counter gear meshed with the other of the pair of odd-numbered speed gears and the other of the pair of even-numbered speed gears, in which the intermediate device may be configured to transmit torque of the first shift module to the second shift module.

The planetary gear set may be a single pinion planetary gear set and include a sun gear directly connected to the output shaft of the output device, a planet carrier directly connected to the counter shaft of the first shift module and selectively connected to the sun gear through a third clutch, and a ring gear selectively connected to a transmission housing through a first brake.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
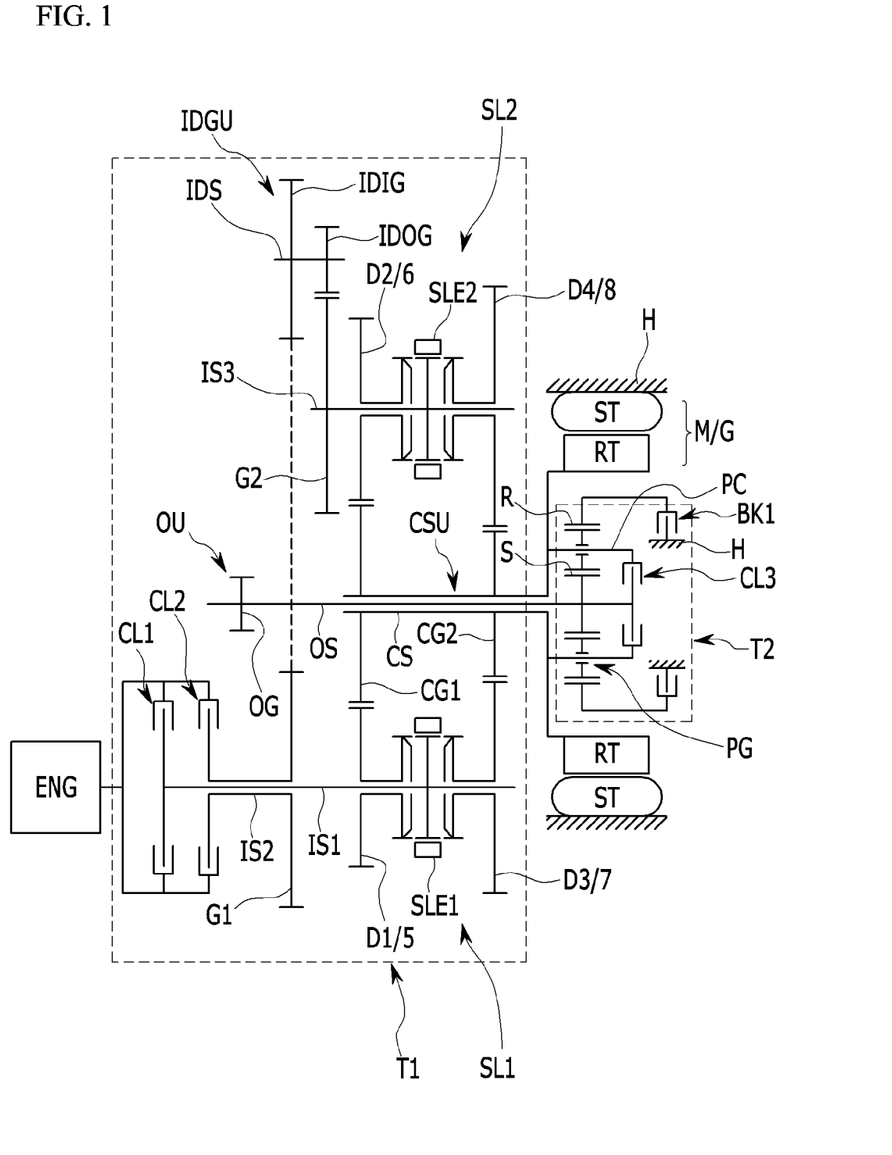
FIG. 1 is a schematic diagram of an exemplary power transmission apparatus according to the present invention.

FIG. 1 is a schematic diagram of a power transmission apparatus according to various embodiments of the present invention.

Referring to FIG. 1, a power transmission apparatus for a vehicle according to various embodiments of the present invention uses an engine ENG as a main power source. The power transmission apparatus includes a first shift module T1 which change torque generated by the engine ENG into four speed stages, a second shift module T2 which achieves eight speed stages using the changed torque by the first shift module T1, a motor/generator MG that is an auxiliary power source, and an output device OU that finally outputs the torque transmitted from the second shift module T2.

The engine ENG may be a gasoline engine or a diesel engine using a fossil fuel.

The first shift module T1 includes first, second, and third input shafts IS1, IS2, and IS3, first and second clutches CL1 and CL2, an idle gear device IDGU, a pair of odd-numbered speed gears, a pair of even-numbered speed gears, first and second synchronizers SL1 and SL2, and an intermediate device CSU.

The first input shaft IS1 is selectively connected to an output side of the engine ENG through a first clutch CL1, and the second input shaft IS2 is a hollow shaft, is disposed at a radial exterior of a front end portion of the first input shaft IS1 without rotational interference therebetween, and is selectively connected to the output side of the engine ENG through a second clutch CL2.

The third input shaft IS3 is disposed in parallel with and apart from the first and second input shafts IS1 and IS2.

In addition, a first input gear G1 is fixedly disposed on the second input shaft IS2 and a second input gear G2 is fixedly disposed on the third input shaft IS3. The second input shaft IS2 and the third input shaft IS3 are operably connected to each other through the idle gear device IDGU.

The idle gear device IDGU includes an idle shaft IDS disposed in parallel with the second and third input shafts IS2 and IS3, an idle input gear IDIG fixedly disposed on the idle shaft IDS and meshed with the first input gear G1, and an idle output gear IDOG fixedly disposed on the idle shaft IDS and meshed with the second input gear G2.

Therefore, torque of the second input shaft IS2 is transmitted to the third input shaft IS3 through the idle shaft IDS, and the third input shaft IS3 rotates in the same direction with the second input shaft IS2.

The pair of odd-numbered speed gears are rotatably disposed on the first input shaft IS1 and are operably connected to the first input shaft IS1 selectively through the first synchronizer SL1.

That is, the pair of odd-numbered speed gears include a 1/5 speed gear D1/5 for achieving a first forward speed stage or a fifth forward speed stage, and a 3/7 speed gear D3/7 for achieving a third forward speed stage or a seventh forward speed stage. The first synchronizer SL1 is disposed between the 1/5 speed gear D1/5 and the 3/7 speed gear D3/7, and operably connects the 1/5 speed gear D1/5 or the 3/7 speed gear D3/7 to the first input shaft IS1.

In addition, the pair of even-numbered speed gears are rotatably disposed on the third input shaft IS3 and are operably connected to the third input shaft IS3 selectively through the second synchronizer SL2.

That is, the pair of even-numbered speed gears includes a 2/6 speed gear D2/6 for achieving a second forward speed stage or a sixth forward speed stage, and a 4/8 speed gear D4/8 for achieving a fourth forward speed stage or an eighth forward speed stage. The second synchronizer SL2 is disposed between the 2/6 speed gear D2/6 and the 4/8 speed gear D4/8 and operably connects the 2/6 speed gear D2/6 or the 4/8 speed gear D4/8 to the third input shaft IS3.

Since the first and second synchronizers SL1 and SL2 are well known to a person of an ordinary skill in the art, detailed description thereof will be omitted. In addition, first and second sleeves SLE1 and SLE2 applied respectively to the first and second synchronizers SL1 and SL2, as well known to a person of an ordinary skill in the art, are operated by additional actuators and the actuators are controlled by a transmission control unit.

In addition, the intermediate device CSU includes a counter shaft CS disposed between and in parallel with the first input shaft IS1 and the third input shaft IS3.

A first counter gear CG1 that is meshed with the 1/5 speed gear D1/5 and the 2/6 speed gear D2/6 is fixedly disposed on one side portion of the counter shaft CS, and a second counter gear CG2 that is meshed with the 3/7 speed gear D3/7 and the 4/8 speed gear D4/8 is fixedly disposed on the other side portion of the counter shaft CS.

Therefore, if the first clutch CL1 is operated, the torque of the engine ENG is transmitted to the first input shaft IS1. If the 1/5 speed gear D1/5 is operably connected to the first input shaft IS1 by operation of the first synchronizer SL1 at this state, rotation speed of the engine ENG is changed according to gear ratios of the 1/5 speed gear D1/5 and the first counter gear CG1 and the changed rotation speed is transmitted to the counter shaft CS.

In addition, if the 3/7 speed gear D3/7 is operably connected to the first input shaft IS1, the rotation speed of the engine ENG is changed according to gear ratios of the 3/7 speed gear D3/7 and the second counter gear CG2 and the changed rotation speed is transmitted to the counter shaft CS.

In addition, if the second clutch CL2 is operated, the torque of the engine ENG is transmitted to the third input shaft IS3 through the idle shaft IDS. If the 2/6 speed gear D2/6 is operably connected to the third input shaft IS3 by operation of the second synchronizer SL2 at this state, rotation speed of the third input shaft IS3 is changed according to gear ratios of the 2/6 speed gear D2/6 and the first counter gear CG1 and the changed rotation speed is transmitted to the counter shaft CS.

In addition, if the 4/8 speed gear D4/8 is operably connected to the third input shaft IS3, the rotation speed of the third input shaft IS3 is changed according to gear ratios of the 4/8 speed gear D4/8 and the second counter gear CG2 and the changed rotation speed is transmitted to the counter shaft CS.

That is, the first clutch CL1 is operated in shifting into the odd-numbered speed stage, and the second clutch CL2 is operated in shifting into the even-numbered speed stage.

Meanwhile, the second shift module T2 includes a planetary gear set PG.

The planetary gear set PG is a single pinion planetary gear set and includes a sun gear S, a planet carrier PC rotatably supporting pinions P externally meshed with the sun gear S, and a ring gear R internally meshed with the pinion P.

In addition, the planet carrier PC is directly connected to the counter shaft CS and is selectively connected to the sun gear S through a third clutch CL3.

In addition, the ring gear R is selectively connected to a transmission housing H by interposing a first brake BK1 therebetween, and the sun gear S is directly connected to an output shaft OS.

Therefore, torque of the counter shaft CS is always input into the planet carrier PC. If the third clutch CL3 is operated at this time, the planetary gear set PG becomes a direct-coupling state and the torque of the counter shaft CS is transmitted to the output shaft OS without change in rotation speed. On the contrary, if the first brake BK1 is operated, the ring gear R is operated as a fixed element and the torque of the counter shaft CS is transmitted to the output shaft OS with rotation speed being increased.

That is, four speed stages input from the first shift module T1 is changed eight speed stages by operation of the third clutch CL3 or the first brake BK1, and the eight speed stages are output.

In addition, the motor/generator MG can be operated as a motor or a generator, and includes a stator ST fixed to the transmission housing H and a rotor RT rotatably supported at a radial interior of the stator ST. The rotor RT is directly connected to the planet carrier PC of the planetary gear set PG and the counter shaft CS.

Therefore, the motor/generator MG generates electrical energy by the torque of the engine ENG, and stores the electrical energy in a battery or supplies the electrical energy to drive the vehicle.

In addition, the output device OU includes the output shaft OS and an output gear OG fixedly disposed on a side portion of the output shaft OS. The output shaft OS penetrates through the hollow counter shaft CS without rotational interference therebetween. The output shaft OS is directly connected to the sun gear S of the planetary gear set PG.

In addition, the output gear OG transmits torque from the output shaft OS to a differential apparatus through a final reduction gear (not shown).

Figure 2:
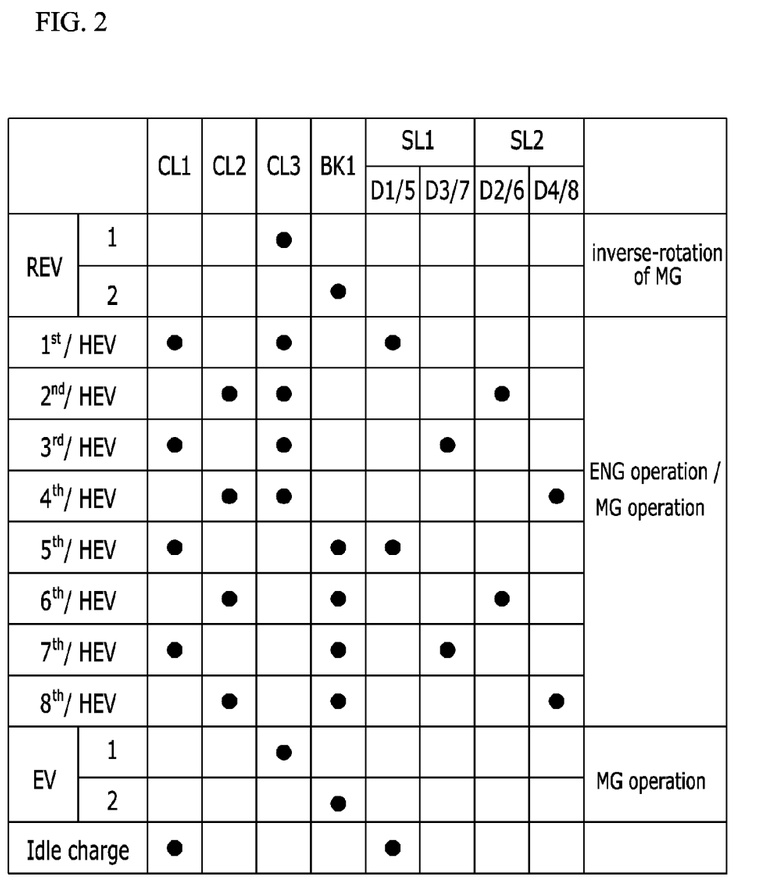
FIG. 2 is an operational chart of the exemplary power transmission apparatus according to the present invention.

FIG. 2 is an operational chart of a power transmission apparatus according to various embodiments of the present invention. Referring to FIG. 2, shifting processes of the power transmission apparatus will be described in detail.

[Reverse Speed Stage]

Reverse speed stages REV are achieved by inverse-rotation of the motor/generator MG.

The third clutch CL3 is operated at a first reverse speed stage. At this time, the planetary gear set PG becomes the direct-coupling state and the inverse rotation of the motor/generator MG is transmitted to the output shaft OS.

The first brake BK1 is operated at a second reverse speed stage. At this time, the inverse-rotation of the motor/generator MG is increased by the planetary gear set PG and the increased inverse rotation is transmitted to the output shaft OS.

[First Forward Speed Stage]

Forward speed stages are achieved by normal-rotation of the engine ENG.

The 1/5 speed gear D1/5 is operably connected to the first input shaft IS1 by the sleeve SLE1 of the first synchronizer SL1 and the first and third clutches CL1 and CL3 are operated at the first forward speed stage.

In this case, the torque of the engine ENG is transmitted to the final reduction gear through the first clutch CL1, the first input shaft IS1, the 1/5 speed gear D1/5, the first counter gear CG1, the counter shaft CS, the planet carrier PC, the third clutch CL3, the output shaft OS, and the output gear OG. Therefore, the vehicle can run at the first forward speed stage.

In addition, after the shift to the first forward speed stage is completed, the 2/6 speed gear D2/6 may be operably connected to the third input shaft IS3 by the sleeve SLE2 of the second synchronizer SL2 for a sequential shift to the second forward speed stage.

[Second Forward Speed Stage]

If vehicle speed increases at the first forward speed stage and the shift to the second forward speed stage is necessary, the first clutch CL1 is released and the second clutch CL2 is operated.

In this case, the 2/6 speed gear D2/6 is operably connected to the third input shaft IS3 by the sleeve SLE2 of the second synchronizer SL2. Therefore, the torque of the engine ENG is transmitted to the final reduction gear through the second clutch CL2, the second input shaft IS2, the first input gear G1, the idle input gear IDIG, the idle shaft IDS, the idle output gear IDOG, the second input gear G2, the third input shaft IS3, the 2/6 speed gear D2/6, the first counter gear CG1, the counter shaft CS, the planet carrier PC, the third clutch CL3, the output shaft OS, and the output gear OG. Therefore, the vehicle can run at the second forward speed stage.

In addition, after the shift to the second forward speed stage is completed, the 3/7 speed gear D3/7 may be operably connected to the first input shaft IS1 by the sleeve SLE1 of the first synchronizer SL1 for a sequential shift to the third forward speed stage.

[Third Forward Speed Stage]

If vehicle speed increases at the second forward speed stage and the shift to the third forward speed stage is necessary, the second clutch CL2 is released and the first clutch CL1 is operated.

In this case, the 3/7 speed gear D3/7 is operably connected to the first input shaft IS1 by the sleeve SLE1 of the first synchronizer SL1. Therefore, the torque of the engine ENG is transmitted to the final reduction gear through the first clutch CL1, the first input shaft IS1, the 3/7 speed gear D3/7, the second counter gear CG2, the counter shaft CS, the planet carrier PC, the third clutch CL3, the output shaft OS, and the output gear OG. Therefore, the vehicle can run at the third forward speed stage.

In addition, after the shift to the third forward speed stage is completed, the 4/8 speed gear D4/8 may be operably connected to the third input shaft IS3 by the sleeve SLE2 of the second synchronizer SL2 for a sequential shift to the fourth forward speed stage.

[Fourth Forward Speed Stage]

If vehicle speed increases at the third forward speed stage and the shift to the fourth forward speed stage is necessary, the first clutch CL1 is released and the second clutch CL2 is operated.

In this case, the 4/8 speed gear D4/8 is operably connected to the third input shaft IS3 by the sleeve SLE2 of the second synchronizer SL2. Therefore, the torque of the engine ENG is transmitted to the final reduction gear through the second clutch CL2, the second input shaft IS2, the first input gear G1, the idle input gear IDIG, the idle shaft IDS, the idle output gear IDOG, the second input gear G2, the third input shaft IS3, the 4/8 speed gear D4/8, the second counter gear CG2, the counter shaft CS, the planet carrier PC, the third clutch CL3, the output shaft OS, and the output gear OG. Therefore, the vehicle can run at the fourth forward speed stage.

In addition, after the shift to the fourth forward speed stage is completed, the 1/5 speed gear D1/5 may be operably connected to the first input shaft IS1 by the sleeve SLE1 of the first synchronizer SL1 for a sequential shift to the fifth forward speed stage.

[Fifth Forward Speed Stage]

If vehicle speed increases at the fourth forward speed stage and the shift to the fifth forward speed stage is necessary, the second and third clutches CL2 and CL3 are released and the first clutch CL1 and the first brake BK1 are operated.

In this case, the 1/5 speed gear D1/5 is operably connected to the first input shaft IS1 by the sleeve SLE1 of the first synchronizer SL1. Therefore, the torque of the engine ENG is transmitted to the final reduction gear through the first clutch CL1, the first input shaft IS1, the 1/5 speed gear D1/5, the first counter gear CG1, the counter shaft CS, the planet carrier PC, the sun gear S, the output shaft OS, and the output gear OG. Therefore, the vehicle runs at the fifth forward speed stage.

That is, the third clutch CL3 of the second shift module T2 is operated and the planetary gear set PG becomes the direct-coupling state at the first forward speed stage. Therefore, the planetary gear set PG does not change rotation speed.

On the contrary, since the ring gear R is operated as a fixed element by operation of the first brake BK1 and the planet carrier PC is operated as an input element at the fifth forward speed stage, rotation speed increases by the sun gear S. Therefore, the fifth forward speed stage is achieved.

In addition, after the shift to the fifth forward speed stage is completed, the 2/6 speed gear D2/6 may be operably connected to the third input shaft IS3 by the sleeve SLE2 of the second synchronizer SL2 for a sequential shift to the sixth forward speed stage.

[Sixth Forward Speed Stage]

If vehicle speed increases at the fifth forward speed stage and the shift to the sixth forward speed stage is necessary, the first clutch CL1 is released and the second clutch CL2 is operated.

In this case, the 2/6 speed gear D2/6 is operably connected to the third input shaft IS3 by the sleeve SLE2 of the second synchronizer SL2. Therefore, the torque of the engine ENG is transmitted to the final reduction gear through the second clutch CL2, the second input shaft IS2, the first input gear G1, the idle input gear IDIG, the idle shaft IDS, the idle output gear IDOG, the second input gear G2, the third input shaft IS3, the 2/6 speed gear D2/6, the first counter gear CG1, the counter shaft CS, the planet carrier PC, the sun gear S, the output shaft OS, and the output gear OG. Therefore, the vehicle can run at the sixth forward speed stage.

That is, the third clutch CL3 of the second shift module T2 is operated and the planetary gear set PG becomes the direct-coupling state at the second forward speed stage. Therefore, the planetary gear set PG does not change rotation speed.

On the contrary, since the ring gear R is operated as a fixed element by operation of the first brake BK1 and the planet carrier PC is operated as an input element at the sixth forward speed stage, rotation speed increases by the sun gear S. Therefore, the sixth forward speed stage is achieved.

In addition, after the shift to the sixth forward speed stage is completed, the 3/7 speed gear D3/7 may be operably connected to the first input shaft IS1 by the sleeve SLE1 of the first synchronizer SL1 for a sequential shift to the seventh forward speed stage.

[Seventh Forward Speed Stage]

If vehicle speed increases at the sixth forward speed stage and the shift to the seventh forward speed stage is necessary, the second clutch CL2 is released and the first clutch CL1 is operated.

In this case, the 3/7 speed gear D3/7 is operably connected to the first input shaft IS1 by the sleeve SLE1 of the first synchronizer SL1. Therefore, the torque of the engine ENG is transmitted to the final reduction gear through the first clutch CL1, the first input shaft IS1, the 3/7 speed gear D3/7, the second counter gear CG2, the counter shaft CS, the planet carrier PC, the sun gear S, the output shaft OS, and the output gear OG. Therefore, the vehicle can run at the seventh forward speed stage.

That is, the third clutch CL3 of the second shift module T2 is operated and the planetary gear set PG becomes the direct-coupling state at the third forward speed stage. Therefore, the planetary gear set PG does not change rotation speed.

On the contrary, since the ring gear R is operated as a fixed element by operation of the first brake BK1 and the planet carrier PC is operated as an input element at the seventh forward speed stage, rotation speed increases by the sun gear S. Therefore, the seventh forward speed stage is achieved.

In addition, after the shift to the seventh forward speed stage is completed, the 4/8 speed gear D4/8 may be operably connected to the third input shaft IS3 by the sleeve SLE2 of the second synchronizer SL2 for a sequential shift to the eighth forward speed stage.

[Eighth Forward Speed Stage]

If vehicle speed increases at the seventh forward speed stage and the shift to the eighth forward speed stage is necessary, the first clutch CL1 is released and the second clutch CL2 is operated.

In this case, the 4/8 speed gear D4/8 is operably connected to the third input shaft IS3 by the sleeve SLE2 of the second synchronizer SL2. Therefore, the torque of the engine ENG is transmitted to the final reduction gear through the second clutch CL2, the second input shaft IS2, the first input gear G1, the idle input gear IDIG, the idle shaft IDS, the idle output gear IDOG, the second input gear G2, the third input shaft IS3, the 4/8 speed gear D4/8, the second counter gear CG2, the counter shaft CS, the planet carrier PC, the sun gear S, the output shaft OS, and the output gear OG. Therefore, the vehicle can run at the eighth forward speed stage.

That is, the third clutch CL3 of the second shift module T2 is operated and the planetary gear set PG becomes the direct-coupling state at the fourth forward speed stage. Therefore, the planetary gear set PG does not change rotation speed.

On the contrary, since the ring gear R is operated as a fixed element by operation of the first brake BK1 and the planet carrier PC is operated as an input element at the eighth forward speed stage, rotation speed increases by the sun gear S. Therefore, the eighth forward speed stage can be achieved.

The shifting processes are exemplified in a case that speed stages are sequentially heightened, the shifting processes may be performed in inverse order when the speed stages are sequentially lowered.

If torque of the motor/generator MG is used as an auxiliary torque for the engine ENG during the shifting processes, hybrid electric vehicle (HEV) mode may be achieved. Therefore, the various embodiments may achieve eight forward speed stages at the HEV mode.

In addition, when vehicle runs by the torque of the engine ENG, the rotor RT of the motor/generator MG is always rotated. In this case, the motor/generator MG is operated as a generator, generates electrical energy, and charges a battery.

In addition, the 1/5 speed gear D1/5 may be operably connected to the first input shaft IS1 by the sleeve SLE1 of the first synchronizer SL1 and the first clutch may be operated at an idle state. In this case, since the rotor RT of the motor/generator MG is rotated by the torque of the engine ENG, the motor/generator MG is operated as a generator, generates electrical energy, and charges the battery.

The power transmission apparatus for a vehicle according to the various embodiments of the present invention may achieve eight forward speed stages and may also achieve eight forward speed stages using the torques of the engine ENG and the motor/generator MG at the HEV mode. Therefore, fuel economy and acceleration performance may be improved.

Since eight forward speed stages are achieved by using two synchronizers SL1 and SL2 and one planetary gear set PG, a layout of the power transmission apparatus may be simple, and fuel economy may be greatly improved and manufacturing cost may be curtailed by losing weight.

In addition, smooth start at EV mode may be achieved only by using the motor/generator MG. Since two forward speed stages and two reverse speed stages may be achieved at the EV mode, fuel economy may be enhanced.

Since the rotor RT of the motor/generator MG is always rotated by the torque of the engine ENG when the vehicle runs, the motor/generator MG may be operated as a generator, may generate electrical energy, and may charge the battery.

Figure 3:
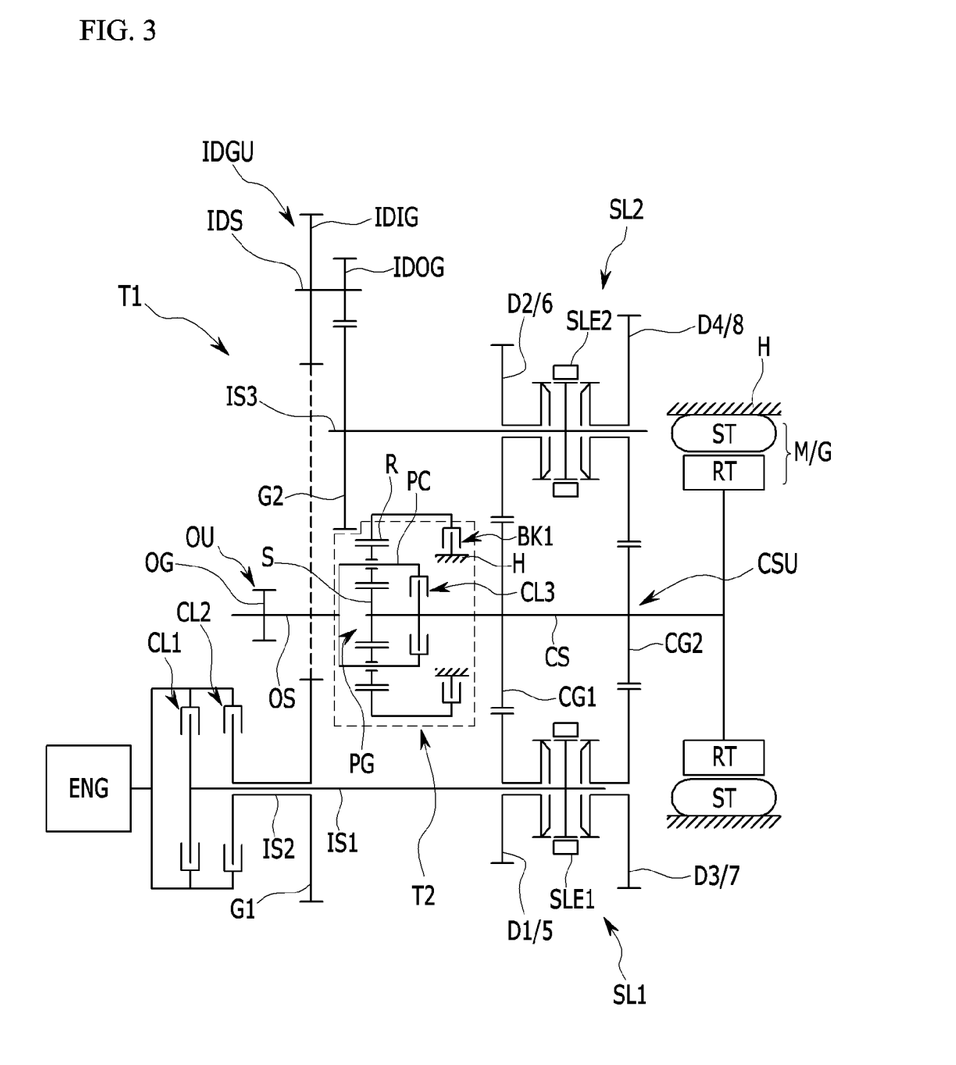
FIG. 3 is a schematic diagram of an exemplary power transmission apparatus according to the present invention.

FIG. 3 is a schematic diagram of a power transmission apparatus according to various embodiments of the present invention.

Referring to FIG. 3, the planetary gear set PG included in the second shift module T2 is disposed at a rear side of the counter shaft CS in various embodiments, but is disposed at a front side portion of the counter shaft CS in the various embodiments.

If the planetary gear set PG included in the second shift module T2 is disposed at the front side portion of the counter shaft CS according to various embodiments, the counter shaft CS does not need to be the hollow shaft, the counter shaft CS is directly connected to the sun gear S, and the third clutch CL3 is interposed between and selectively connects the sun gear S and the planet carrier PC.

In this case, if the third clutch CL3 is operated, the torque is output without change in rotation speed. On the contrary, if the first brake BK1 is operated, the torque is output with the rotation speed being decreased.

Figure 4:
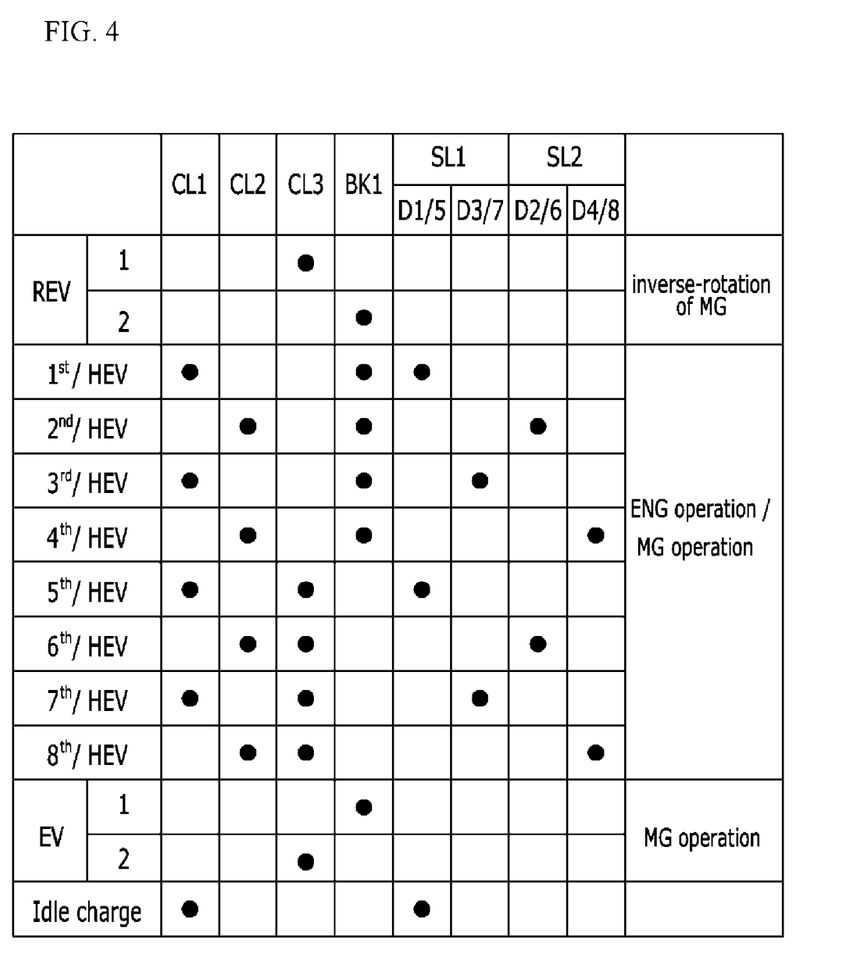
FIG. 4 is an operational chart of the exemplary power transmission apparatus of FIG. 3, according to the present invention.

FIG. 4 is an operational chart of a power transmission apparatus according to various embodiments of the present invention.

Referring to FIG. 4, the first brake BK1 is operated at the first, second, third, and fourth forward speed stages and the third clutch CL3 is operated at the fifth, sixth, seventh, and eighth forward speed stages in the power transmission apparatus according to the various embodiments of FIG. 3, compared with previously described embodiments. However, since the shifting processes of the various embodiments of FIG. 3 are the same as those of the previously described embodiments, detailed description will be omitted.

The power transmission apparatus for a vehicle according to various embodiments of the present invention may achieve eight forward speed stages and may also achieve eight forward speed stages using the torques of the engine ENG and the motor/generator MG at the HEV mode. Therefore, fuel economy and acceleration performance may be improved.

Since eight forward speed stages are achieved by using two synchronizers and one planetary gear set, a layout of the power transmission apparatus may be simple, and fuel economy may be greatly improved and manufacturing cost may be curtailed by losing weight.

In addition, smooth start at EV mode may be achieved only by using the motor/generator MG. Since two forward speed stages and two reverse speed stages may be achieved at the EV mode, fuel economy may be enhanced.

Since the rotor of the motor/generator is always rotated by the torque of the engine when the vehicle runs, the motor/ generator may be operated as a generator, may generate electrical energy, and may charge the battery.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission apparatus for a vehicle, comprising:
    a first shift module configured to change torque input from an engine into four speed stages and to output the four speed stages;
    a motor/generator directly connected an output side of the first shift module;
    a second shift module configured to change the four speed stages input from the first shift module into eight speed stages by using a planetary gear set and to output the eight speed stages; and
    an output device connected to an output side of the second shift module through an output shaft.

2. The power transmission apparatus of claim 1, wherein the first shift module comprises:
    a first input shaft selectively connected to an output side of the engine through a first clutch;
    a second input shaft being a hollow shaft, enclosing the first input shaft, selectively connected to the output side of the engine through a second clutch, and provided with a first input gear fixedly disposed thereon;
    a third input shaft disposed in parallel with and apart from the first and second input shafts, and provided with a second input gear fixedly disposed thereon;
    an idle gear device meshed with the first input gear on the second input shaft and the second input gear on the third input shaft to transmit torque of the second input shaft to the third input shaft without change in rotating direction;
    a pair of odd-numbered speed gears rotatably disposed on the first input shaft and operably connected to the first input shaft selectively through a first synchronizer;
    a pair of even-numbered speed gears rotatably disposed on the third input shaft and operably connected to the third input shaft selectively through a second synchronizer; and
    an intermediate device including a counter shaft disposed on a same axis with the output shaft, changing the torque of the engine through a plurality of counter gears meshed with the pair of odd-numbered and even-numbered speed gears, and outputting the changed torque into the second shift module.

3. The power transmission apparatus of claim 2, wherein the idle gear device comprises:
    an idle shaft disposed in parallel with the second and third input shafts;
    an idle input gear fixedly disposed on as first side portion of the idle shaft and meshed with the first input gear on the second input shaft; and
    an idle output gear fixedly disposed on a second side portion of the idle shaft and meshed with the second input gear on the third input shaft.

4. The power transmission apparatus of claim 2, wherein the pair of odd-numbered speed gears comprise:
    a 1/5 speed gear for achieving a first forward speed stage or a fifth forward speed stage; and
    a 3/7 speed gear for achieving a third forward speed stage or a seventh forward speed stage,
    wherein the 1/5 speed gear or the 3/7 speed gear is operably connected to the first input shaft through the first synchronizer.

5. The power transmission apparatus of claim 2, wherein the pair of even-numbered speed gears comprise:
    a 2/6 speed gear for achieving a second forward speed stage or a sixth forward speed stage; and
    a 4/8 speed gear for achieving a fourth forward speed stage or an eighth forward speed stage,
    wherein the 2/6 speed gear or the 4/8 speed gear is operably connected to the third input shaft through the second synchronizer.

6. The power transmission apparatus of claim 2, wherein the intermediate device comprises:
    the counter shaft being a hollow shaft and enclosing the output shaft of the output device;
    a first counter gear meshed with one of the pair of odd-numbered speed gears and one of the pair of the even-numbered speed gears; and
    a second counter gear meshed with another of the pair of odd-numbered speed gears and another of the pair of even-numbered speed gears,
    wherein the intermediate device is configured to transmit torque of the first shift module to the second shift module.

7. The power transmission apparatus of claim 2, wherein the second shift module comprises:
    the planetary gear set including three rotation elements;
    a third clutch selectively connecting a first rotation element of the planetary gear set directly connected to the counter shaft of the first shift module with a second rotation element of the planetary gear set directly connected to the output shaft; and
    a first brake selectively connecting a third rotation element of the planetary gear set directly connected to the output shaft with a transmission housing.

8. The power transmission apparatus of claim 2, wherein the planetary gear set is a single pinion planetary gear set and includes a sun gear directly connected to the output shaft of the output device, a planet carrier directly connected to the counter shaft of the first shift module and selectively connected to the sun gear through a third clutch, and a ring gear selectively connected to a transmission housing through a first brake.

9. The power transmission apparatus of claim 2, wherein the intermediate device comprises:
    the counter shaft disposed at the rear of and on a same axis with the output shaft of the output device;
    a first counter gear meshed with one of the pair of odd-numbered speed gears and one of the pair of even-numbered speed gears; and
    a second counter gear meshed with the other of the pair of odd-numbered speed gears and the other of the pair of even-numbered speed gears,
    wherein the intermediate device is configured to transmit torque of the first shift module to the second shift module.

10. The power transmission apparatus of claim 2, wherein the second shift module comprises:
- the planetary gear set disposed at a front end portion of the counter shaft of the first shift module and including three rotation elements;
- a third clutch selectively connecting a first rotation element of the planetary gear set directly connected to the counter shaft of the first shift module with a second rotation element of the planetary gear set directly connected to the output shaft; and
- a first brake selectively connecting a third rotation element of the planetary gear set with a transmission housing.

11. The power transmission apparatus of claim 1, wherein the second shift module is configured to output torque received from the first shift module to the output device without change in rotation speed or with the rotation speed being decreased by operation of the planetary gear set.

12. The power transmission apparatus of claim 1, wherein the motor/generator comprises:
- a rotor directly connected to the output side of the first shift module and being rotatable; and
- a stator fixed to a transmission housing at a radial exterior of the rotor.

13. The power transmission apparatus of claim 1, wherein the second shift module is configured to output torque received from the first shift module to the output device without change in rotation speed or with the rotation speed being increased by operation of the planetary gear set.

14. The power transmission apparatus of claim 11, wherein the planetary gear set is a single pinion planetary gear set and includes a sun gear directly connected to a counter shaft of first shift module, a planet carrier directly connected to the output shaft of the output device and selectively connected to the sun gear through a third clutch, and a ring gear selectively connected to a transmission housing through a first brake.

15. A power transmission apparatus for a vehicle, comprising:
- a first shift module including a first input shaft selectively connected to an output side of the engine through a first clutch, a second input shaft being a hollow shaft, enclosing the first input shaft, selectively connected to the output side of the engine through a second clutch, and provided with a first input gear fixedly disposed thereon, a third input shaft disposed in parallel with and apart from the first and second input shafts, and provided with a second input gear fixedly disposed thereon, an idle gear device meshed with the first input gear on the second input shaft and the second input gear on the third input shaft to transmit torque of the second input shaft to the third input shaft, a pair of odd-numbered speed gears rotatably disposed on the first input shaft and operably connected to the first input shaft selectively through a first synchronizer, a pair of even-numbered speed gears rotatably disposed on the third input shaft and operably connected to the third input shaft selectively through a second synchronizer, and an intermediate device including a counter shaft disposed in parallel with the second and third input shafts, changing the torque of the engine through a plurality of counter gears meshed with the pair of odd-numbered and even-numbered speed gears, and outputting the changed torque;
- a motor/generator directly connected to the counter shaft at the rear of the counter shaft;
- a second shift module including a planetary gear set including three rotation elements, a third clutch selectively connecting a first rotation element of the planetary gear set directly connected to the counter shaft of the first shift module with a second rotation element operated as an output element, and a first brake selectively connecting a third rotation element operated as an output element with a transmission housing; and
- an output device connected to the output element of the planetary gear set through an output shaft.

16. The power transmission apparatus of claim 15, wherein the idle gear device comprises:
- an idle shaft disposed in parallel with the second and third input shafts;
- an idle input gear fixedly disposed on a first side portion of the idle shaft and meshed with the first input gear on the second input shaft; and
- an idle output gear fixedly disposed on a second side portion of the idle shaft and meshed with the second input gear on the third input shaft.

17. The power transmission apparatus of claim 15, wherein the intermediate device comprises:
- the counter shaft being a hollow shaft and enclosing the output shaft of the output device;
- a first counter gear meshed with one of the pair of odd-numbered speed gears and one of the pair of even-numbered speed gears; and
- a second counter gear meshed with the other of the pair of odd-numbered speed gears and the other of the pair of even-numbered speed gears,
- wherein the intermediate device is configured to transmit torque of the first shift module to the second shift module.

18. The power transmission apparatus of claim 15, wherein the planetary gear set is a single pinion planetary gear set and includes a sun gear directly connected to the output shaft of the output device, a planet carrier directly connected to the counter shaft of the first shift module and selectively connected to the sun gear through a third clutch, and a ring gear selectively connected to a transmission housing through a first brake.

19. The power transmission apparatus of claim 15, wherein the intermediate device comprises:
- the counter shaft disposed at the rear of and on a same axis with the output shaft of the output device;
- a first counter gear meshed with one of the pair of odd-numbered speed gears and one of the pair of even-numbered speed gears; and
- a second counter gear meshed with another of the pair of odd-numbered speed gears and another of the pair of even-numbered speed gears,
- wherein the intermediate device is configured to transmit torque of the first shift module to the second shift module.

20. The power transmission apparatus of claim 15, wherein the planetary gear set is a single pinion planetary gear set and includes a sun gear directly connected to the counter shaft of first shift module, a planet carrier directly connected to the output shaft of the output device and selectively connected to the sun gear through a third clutch, and a ring gear selectively connected to a transmission housing through a first brake.

* * * * *